United States Patent
An et al.

(10) Patent No.: US 11,359,258 B2
(45) Date of Patent: *Jun. 14, 2022

(54) METHOD OF INHIBITING DEGRADATION OF DSX EXTRACTANT BY AUXILIARY MEANS

(71) Applicant: KOREA RESOURCES CORPORATION, Wonju-si (KR)

(72) Inventors: Jeon Woong An, Wonju-si (KR); Youn Kyu Yi, Wonju-si (KR); Yong Hoon Lim, Wonju-si (KR); Young Hun Kim, Gwangmyeong-si (KR)

(73) Assignee: KOREA RESOURCES CORPORATION, Wonju-si (KR)

( * ) Notice: Subject to any disclaimer, the term of this patent is extended or adjusted under 35 U.S.C. 154(b) by 469 days.

This patent is subject to a terminal disclaimer.

(21) Appl. No.: 16/560,231

(22) Filed: Sep. 4, 2019

(65) Prior Publication Data

US 2021/0062293 A1  Mar. 4, 2021

(51) Int. Cl.
*C22B 3/26* (2006.01)
*B01D 11/04* (2006.01)
*C22B 3/00* (2006.01)
*C22B 3/08* (2006.01)

(52) U.S. Cl.
CPC ............ *C22B 3/26* (2021.05); *B01D 11/0484* (2013.01); *B01D 11/0488* (2013.01); *B01D 11/0492* (2013.01); *C22B 3/08* (2013.01); *C22B 19/26* (2013.01); *C22B 23/0453* (2013.01)

(58) Field of Classification Search
CPC .. C22B 3/26; C22B 3/08; C22B 19/26; C22B 23/0453; B01D 11/0484
USPC .......................................................... 423/109
See application file for complete search history.

(56) References Cited

U.S. PATENT DOCUMENTS

| | | | | |
|---|---|---|---|---|
| 6,517,701 | B1 * | 2/2003 | Geisler | .................. C22B 19/26 205/544 |
| 11,169,127 | B2 * | 11/2021 | Lee | ..................... G01N 30/8679 |
| 11,203,531 | B2 * | 12/2021 | An | ........................ C01G 9/003 |
| 2018/0105896 | A1 * | 4/2018 | Yoneyama | .............. C22B 23/00 |
| 2020/0283305 | A1 * | 9/2020 | Lee | ......................... C22B 19/26 |
| 2021/0024366 | A1 * | 1/2021 | An | ......................... C01G 45/10 |

(Continued)

FOREIGN PATENT DOCUMENTS

CN      108893609 A  * 11/2018  ......... C22B 15/0071

Primary Examiner — Melissa S Swain
(74) Attorney, Agent, or Firm — Cantor Colburn LLP

(57) ABSTRACT

A method of inhibiting degradation of an extractant by utilizing several auxiliary means in the DSX process: includes (a) preparing adjustment of the concentration of an extractant of a DSX solvent to a certain range; (b) extracting a metal contained in a pregnant leached solution by adjusting the ratio of the extractant and the diluent in the DSX solvent to a certain range; (c) measuring the pH of the aqueous phase solution by separating mixture into the aqueous phase solution and the organic phase solvent using a settler after step of extracting; (d) controlling the pH by adding soda ash ($Na_2CO_3$) so as to maintain the pH of the aqueous phase solution to be 3 to 7; and (e) scrubbing with scrubbing solution having a zinc concentration of 2 to 20 g/L by zinc sulfate ($ZnSO_4$) to remove the manganese from the organic phase solvent containing the extracted metal.

6 Claims, 3 Drawing Sheets

(56) References Cited

U.S. PATENT DOCUMENTS

2021/0024367 A1\* 1/2021 An .......................... C01F 7/34
2021/0024369 A1\* 1/2021 An ..................... C22B 23/0461

\* cited by examiner

METHOD OF INHIBITING DEGRADATION OF DSX EXTRACTANT BY AUXILIARY MEANS

BACKGROUND OF THE INVENTION

1. Field of the Invention

The present invention relates to a method of inhibiting the degradation of extractants, and more specifically, a method of effectively inhibiting the degradation of extractants by utilizing several auxiliary means in Boleo cobalt/zinc solvent extraction (synergistic solvent extraction, DSX).

2. Description of the Related Art

The cobalt/zinc solvent extraction is a process of simultaneously extracting cobalt and zinc using two solvents. To increase the extraction rate, soda ash ($Na_2CO_3$) is added to adjust the optimum pH.

The soda ash added by the above method adjusts the pH to increase the extraction rate, but it reacts with cobalt or manganese so that cobalt carbonate ($CoCO_3$) or manganese carbonate ($MnCO_3$) are precipitated to lower the extraction rate and to cause degradation of the extractant, resulting in difficulty to recover cobalt and zinc.

The higher pH of the pH adjusted by the above method is, the higher the extraction rate of cobalt and zinc to be recovered, but the extraction rate of manganese, cadmium and copper ions acting as impurities is higher.

The manganese extracted by the method is the main cause of the oxime degradation, which is an extractant, and the high manganese extraction in the DSX process causes the degradation of the extractant.

When the extractant is decomposed by the method, impurities (cobalt, zinc, manganese, cadmium, copper ions, etc.) extracted by the method overload the extraction capacity of the oxime in the extractant. Thus, it increases the mol total metal/mol oxime to accelerate the degradation of the extractant.

When the degradation of the extractant is accelerated by the method, the extraction capacity of the oxime in the process is decreased to reduce the extraction rate of cobalt and zinc to be recovered.

When the extraction rate is lowered by the method during the operation, the operation tends to increase the extraction rate through the operation at a pH higher than the optimum pH, but this accelerates the degradation of the extractant and causes a vicious cycle of the process.

Since the extraction rate is lowered when a vicious cycle is progressed by the method, the extractant must be continuously supplied in an amount equal to or greater than the decomposed amount. If the vicious circle is continuously maintained, the accelerating degradation of the extractant requires an additional feed of vast extractants, and if it gets worse, the degradation of the extractant cannot be reversed and the DSX process must be stopped. If the DSX process is re-operated, it will incur enormous economic losses to remove all the solvents (all the decomposed extractants) put into the DSX process and then to re-input the same.

The DSX process consists of total of six steps including two extracting steps, two scrubbing steps, and two stripping steps. Each step consists of three stirrer reaction tanks and a settler.

The extracting step is a process of extracting metals contained in a pregnant leached solution by adjusting the optimum extraction pH of cobalt/zinc with soda ash ($Na_2CO_3$). Since metal-extracted solvent contains manganese, which is an impurity, manganese is removed in the scrubbing step. In the scrubbing step, the scrubbing solution is supplied by adjusting concentration of zinc using the zinc sulfate self-produced in Boleo. The solution is reacted with the solvent containing manganese. Thus, the substitution reaction is induced so that zinc is extracted by a solvent, and manganese is stripped by the solution. Further, in the stripping step, the manganese-removed solvent and the sulfuric acid ($H_2SO_4$) concentration-controlled stripping solution are reacted, and the metal ions extracted in the solvent are all stripped and concentrated in the solution. The metal-stripped solvent through the stripping step is again transported to the extracting step for use to extract the metal and repeat the circulation step of the DSX process.

In general solvent extraction, the pH is controlled at the extracting step according to the extraction isotherm curve, and it is difficult to measure the exact pH due to the interference of the solvent when measuring the pH in a case which the solvent and the solution are mixed. When it is difficult to measure the pH, and then DSX process is operated with high pH using the inaccurate pH measurement value as an indicator, the high extraction of impurities is caused to overload the extraction capacity. Therefore, in order to prevent the degradation of the extractant, it is necessary to drive the operation by measuring the exact pH differently from the ordinary solvent extraction.

The extracting step of the DSX process should be adjusted to the neutral region of pH. It is difficult to control such pH, and the error range of the pH indicated value should be small compared to the acidic and alkaline regions. The pH adjustment in the extracting step is most important to be adjusted to about 0.3 from the target value. However, general solvent extraction can regulate the pH and treat impurities by circulating the solution even if the pH control fails. However, the DSX process has a problem that it is difficult to solve the issues due to the influence of the degradation of the extractant.

For example, copper solvent extraction extracts copper to the maximum capacity of the extractant while maintaining an appropriate pH. While maintaining an appropriate pH, copper can be extracted to the maximum capacity of the extractant, and there is no influence on the degradation of the extractant. Thus, there is an economical advantage in that an extractant is not required to be excessively added to the process when extracted by the method.

However, if the valuable metals are extracted up to the maximum capacity of the extractant in the DSX process as in general solvent extraction, it causes oxime overload in the extractant, and the mol total metal/mol oxime is increased to cause the degradation of the extractant. It is essential that the DSX process adjusts pH in the extracting step to inhibit the extraction of impurities and to prevent overloading of the extractant.

Further, in order to identify whether the extractant degradation and pH are properly controlled during the extracting step of the DSX process, the extraction amount of cadmium per mol oxime can be used as an indirect indicator.

The degree of degradation of the extractant can be predicted according to the change in the value of the mol cadmium to mol oxime in the optimum pH range. When the value of the mol cadmium to mol oxime is high, it can be predicted that the extractant is decomposed, and the pH is controlled to be higher than the reference value.

Since the DSX process described above has a very serious effect on the degradation of the extractant according to the pH control, if it is operated in the same manner as the conventional solvent extraction, it accelerates the degradation and cannot be operated by the same manner as general solvent extraction.

SUMMARY OF THE INVENTION

Accordingly, an object of the present invention is to provide a novel method of effectively inhibiting the degradation of extractants by utilizing several auxiliary means in Boleo cobalt/zinc solvent extraction (DSX).

In order to address the above-described issues, the present invention provides a method of inhibiting degradation of an extractant in the DSX process by utilizing several auxiliary means, including the steps of preparing, extracting, measuring the pH, and controlling the pH and scrubbing, in which the method includes the steps of: (a) preparing adjustment of the concentration of an extractant of a DSX solvent to a certain range; (b) extracting a metal contained in a pregnant leached solution by adjusting the ratio of the extractant and the diluent in the DSX solvent to a certain range; (c) measuring the pH of the aqueous phase solution by separating mixture into the aqueous phase solution and the organic phase solvent using a settler after step of extracting; (d) controlling the pH by adding soda ash ($Na_2CO_3$) so as to maintain the pH of the aqueous phase solution to be 3 to 7; and (e) scrubbing with scrubbing solution having a zinc concentration of 2 g/L to 20 g/L by zinc sulfate ($ZnSO_4$) in order to remove the manganese from the organic phase solvent containing the extracted metal.

Further, the present invention provides the method of inhibiting degradation of an extractant in the DSX process by utilizing several auxiliary means in which the pH 3 to 7 of the step (d) is determined by the value of mol oxime to mol cadmium.

Further, the present invention provides the method of inhibiting degradation of an extractant in the DSX process by utilizing several auxiliary means in which when the zinc sulfate of the step (e) is dried in powder form, a dryer is used at a temperature of 120° C. to 160° C., which is higher than the flash point in order to remove the solvent of the zinc solvent extraction entrained in the zinc sulfate stripping solution.

Further, the present invention provides the method of inhibiting degradation of an extractant in the DSX process by utilizing several auxiliary means in which the pH is controlled by controlling the amount of soda ash in the step (c) through the measured pH of the step (b).

Further, the present invention provides the method of inhibiting degradation of an extractant in the DSX process by utilizing several auxiliary means in which the DSX solvent of the step (a) includes oxime-based and neodecanoic acid-based extractants in kerosene as a diluent, and in which the concentration of the oxime-based extractant is in the range of 0.5 v/v % to 6 v/v %.

Further, the present invention provides the method of inhibiting degradation of an extractant in the DSX process by utilizing several auxiliary means in which the step (b) uses at least one stirrer reaction tank, and in which for each stirrer reaction tank, stirring is performed in a volume ratio of DSX solvent to pregnant leached solution of 0.5 to 3 at a temperature of 35° C. to 55° C. for 0.5 minutes to 3 minutes.

The present invention has effects of effectively inhibiting the degradation of extractants by utilizing several auxiliary means in Boleo cobalt/zinc solvent extraction (DSX).

DESCRIPTION OF REFERENCE NUMERALS

Figure 1:
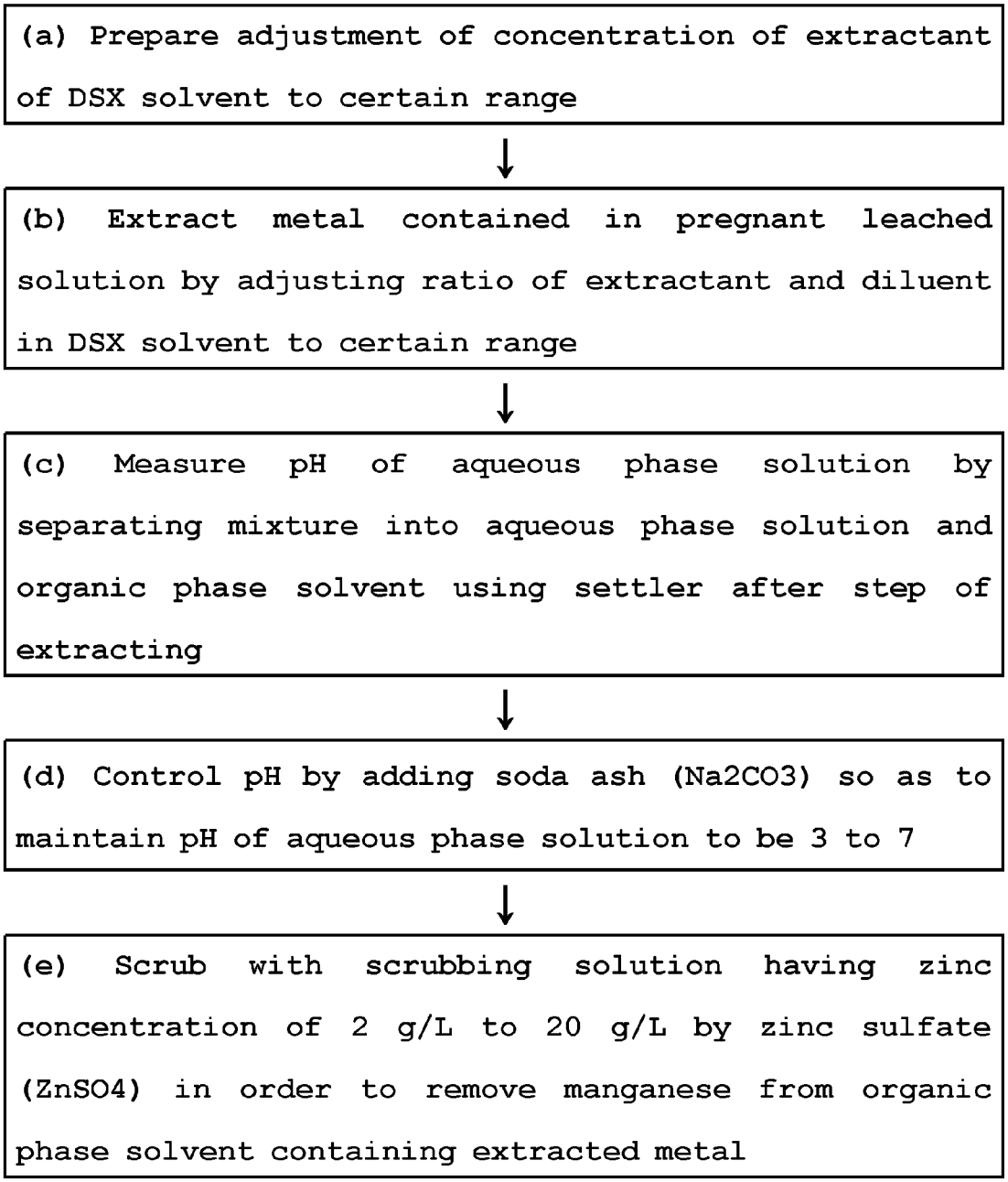
FIG. 1 is a flowchart of a method of inhibiting the degradation of extractants of DSX process by utilizing several auxiliary means according to the present invention.

10: mixed solution feed pipe
20, 21: organic phase solvent outlet
30, 31: aqueous phase solution outlet
40: pH meter
50: collection tank
60: settler

DETAILED DESCRIPTION OF THE PREFERRED EMBODIMENT

Hereinafter, preferred embodiments of the present invention are described in detail. In the following description of the present invention, a detailed description of known functions and configurations incorporated herein is excluded so as to avoid obscuring the subject matter of the present invention.

As used herein, the terms "about" or "substantially", or the like, which represents a degree, are used as meanings at numerical values or approaching the numerical values when inherent tolerances of preparation and material are presented to the above-mentioned meanings and they are used to prevent unconscientious invaders from unfairly using the contents in which accurate or absolute numerical values are disclosed in order to help the understandings of the present invention.

Hereinafter, exemplary embodiments of the present invention are described in detail with reference to the accompanying drawings, which are readily apparent to those skilled in the art to which the present invention pertains. The present invention may be embodied in many different forms and is not limited to the exemplary embodiments described herein.

FIG. 1 is a flowchart of a method of inhibiting the degradation of extractants of DSX process by utilizing several auxiliary means according to the present invention.

The present invention includes the steps of preparing, extracting, measuring the pH, and controlling the pH and scrubbing. The present invention is divided into the steps of: (a) preparing adjustment of the concentration of an extractant of a DSX solvent to a certain range; (b) extracting a metal contained in a pregnant leached solution by adjusting the ratio of the extractant and the diluent in the DSX solvent to a certain range; (c) measuring the pH of the aqueous phase solution by separating mixture into the aqueous phase solution and the organic phase solvent using a settler after step of extracting; (d) controlling the pH by adding soda ash ($Na_2CO_3$) so as to maintain the pH of the aqueous phase solution to be 3 to 7; and (e) scrubbing with scrubbing solution having a zinc concentration of 2 g/L to 20 g/L by zinc sulfate ($ZnSO_4$) in order to remove the manganese from the organic phase solvent containing the extracted metal.

In the step (a), the DSX solvent includes kerosene-based compound as a diluent and the extractant includes oxime-based and neodecanoic acid-based extractants.

Further, the concentration of the oxime-based extractant is controlled to be 0.5 v/v % to 6 v/v %. The mixing ratio of the oxime-based extractant to the neodecanoic acid-based extractant is 1:0.5 to 1:4 in a volume ratio.

In order to extract cobalt and zinc from the pregnant leached solution in the step (b), the pregnant leached solution and the DSX solvent can be subjected to a solvent extraction process several times using one stirrer reaction tank or a plurality of stirrer reaction tanks. In other words, a plurality of stirrer reaction tanks is used in the step (b). The first stirrer reaction tank is used to obtain the solution and the solvent in which cobalt and zinc are extracted. The solution and the solvent can be sequentially treated in the same manner in the next stirrer reaction tank. In each of the stirrer reaction tanks, stirring is performed in a volume ratio of DSX solvent to pregnant leached solution of 1:0.5 to 1:3 at a temperature of 35° C. to 55° C. for 0.5 minutes to 3 minutes.

The extracted solution and solvent are mixed by each stirrer reaction tank and sequentially transferred to the next stirrer reaction tank, and they are transferred from each stirrer reaction tank to the settler to measure the pH.

Figure 2:
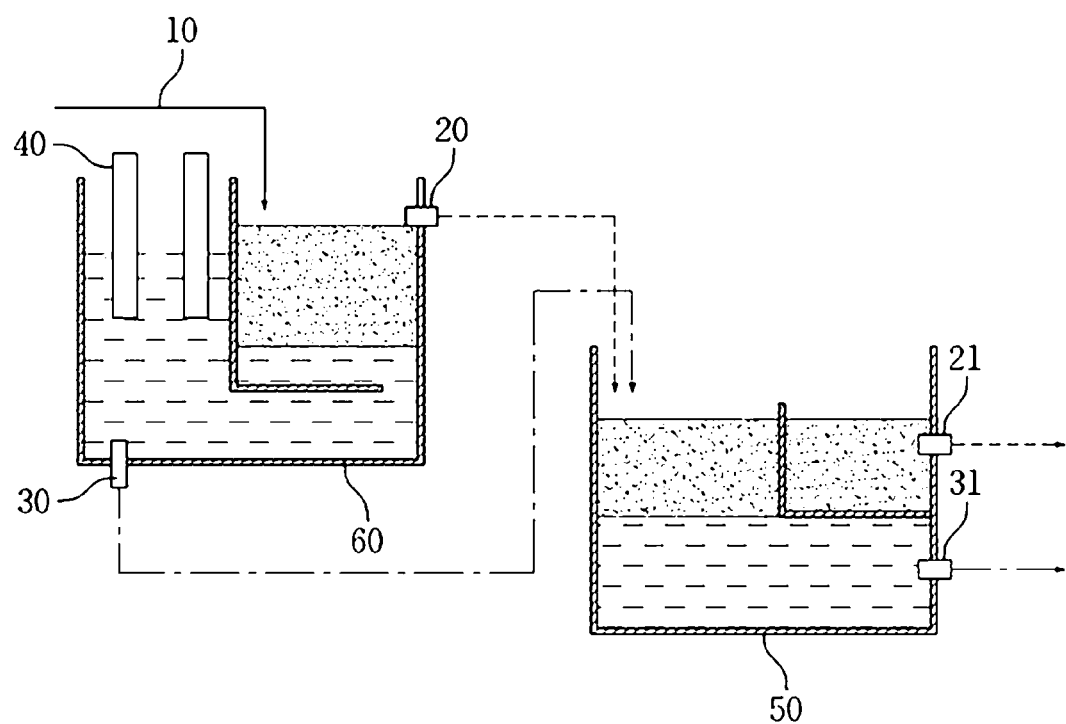
FIG. 2 is a schematic view of a settler for pH measurement in the present invention.

FIG. 2 is a schematic view of settler for pH measurement in the present invention.

In the step (c), the mixed solution stirred for extraction in the step (b) is transferred to the settler 60 through the mixed solution feed pipe 10. The settler 60 is physically separated like it has partitions, and the mixed solution is separated into two layers such as the organic phase and the aqueous phase by a specific gravity in a stable state. At this time, only the aqueous solution having a heavy specific gravity is placed in the separated space, and the pH is measured by the pH meter 40.

After separating the aqueous phase solution, the separated organic phase solvent and the aqueous phase solution, respectively, are collected into a collection tank 50 through the organic phase solvent outlet 20 and aqueous phase solution outlet 30.

In the step (d), the amount of soda ash ($Na_2CO_3$) is adjusted to control appropriate pH so as to be pH of 3 to 7, preferably 3.5 to 6, and more preferably 4 to 5 based on the pH measured in the step (c).

When the solvent extraction in step (b) is carried out using a plurality of stirrer reaction tanks, stirring is performed at a pH of 4 to 5 at a temperature of 35° C. to 55° C. for 0.5 minutes to 3 minutes in all the stirrer reaction tanks.

When one or more stirrer reaction tanks are used in step (b), cobalt (Co) and zinc (Zn) can be recovered by the following reaction formulas 1 and 2.

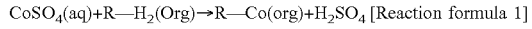
$CoSO_4(aq)+R-H_2(Org) \rightarrow R-Co(org)+H_2SO_4$ [Reaction formula 1]

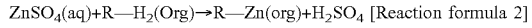
$ZnSO_4(aq)+R-H_2(Org) \rightarrow R-Zn(org)+H_2SO_4$ [Reaction formula 2]

In the step (b), the extraction may be repeated two or more times in the reaction formulas.

The cobalt and zinc can be recovered by the DSX solvent through the step (b). Even if the extraction of manganese (Mn), which is an impurity, is inhibited, a small amount of manganese is extracted by the following reaction formula 3.

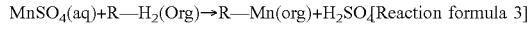
$MnSO_4(aq)+R-H_2(Org) \rightarrow R-Mn(org)+H_2SO_4$ [Reaction formula 3]

In order to remove the extracted manganese as an impurity, the step (e) may be performed by dissolving zinc sulfate produced in the Boleo in the scrubbing solution to adjust the zinc concentration to be used, and the concentration of zinc in the scrubbing solution is adjusted to be 2 to 20 g/L.

When zinc sulfate is prepared in the Boleo, the solvent of the entrained zinc solvent extraction should be removed in the zinc stripping solution. This is because the zinc solvent extraction solvent may affect the degradation of the extractant when cross-contaminated with the solvent of the DSX process.

The stripping solution is maintained at a temperature of 120° C. to 160° C. higher than the flash point of the zinc solvent extraction solvent using a fluid bed dryer to prepare a zinc sulfate powder. The prepared zinc sulfate powder is used to adjust zinc concentration in the scrubbing solution, and the scrubbing solution is used to remove manganese, which is an impurity, in the scrubbing step.

The scrubbing step is performed according to the following reaction formula, and manganese (Mn), which is an impurity, can be removed.

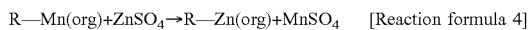
$R-Mn(org)+ZnSO_4 \rightarrow R-Zn(org)+MnSO_4$ [Reaction formula 4]

Consequently, in the step (e), the manganese-removed solvent can be recovered by the above reaction formula.

Figure 3:
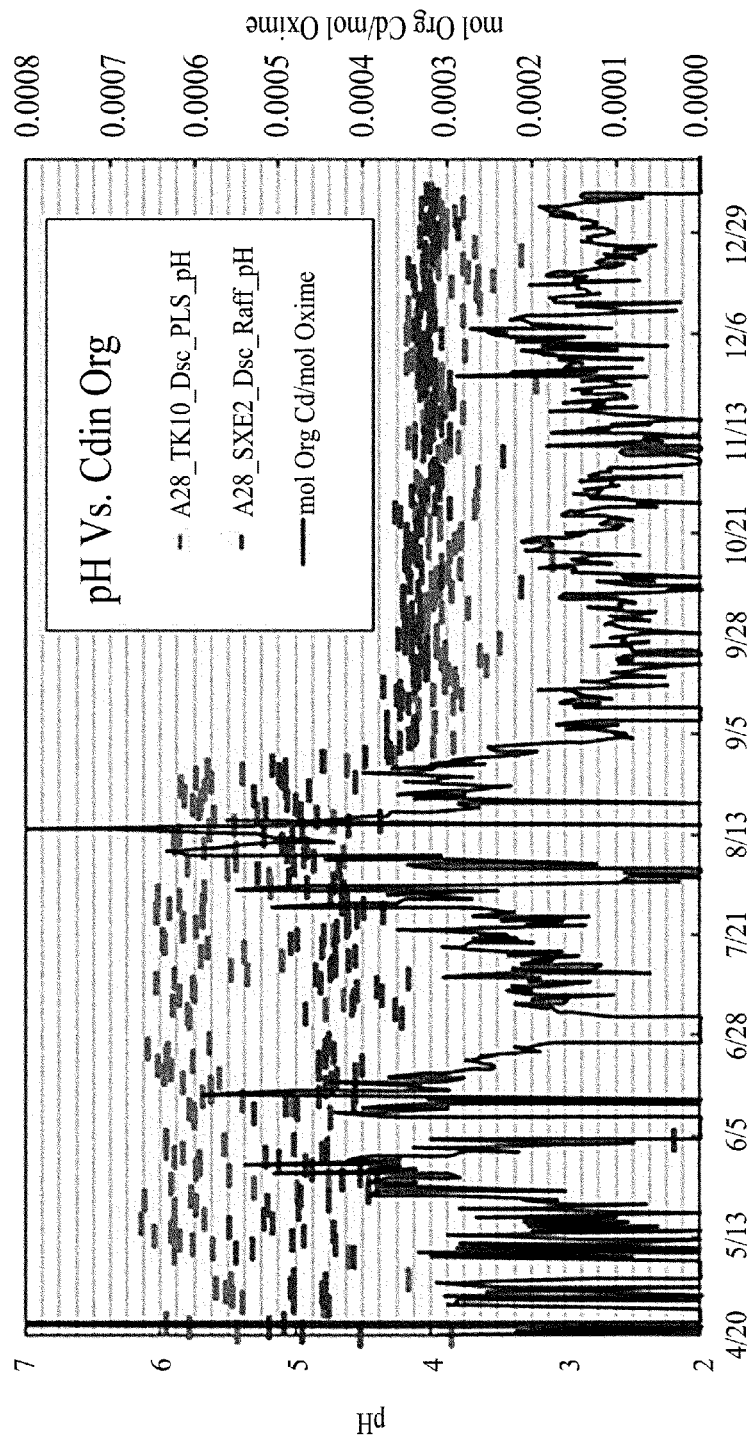
FIG. 3 shows the values of the amount of cadmium extracted per mol oxime according to pH in the present invention.

FIG. 3 shows the values of mol oxime of DSX solvent to mol cadmium by analyzing the concentration of cadmium which is an impurity to be extracted in the step (b).

The cadmium concentration is analyzed to identify the values of mol cadmium to mol oxime and may be thus used as an auxiliary means indirectly determining whether the extractant degradation and pH adjustment during operation are properly adjusted.

In other words, FIG. 3 relates to a graph of cadmium instead of manganese as a graph of the amount of manganese metal extracted (loaded) per unit of oxime according to pH. It shows that even when the pH is high, the value of mol cadmium/mol oxime tends to be low or high.

It is confirmed that When the mol oxime is lowered due to the rapid degradation of the extractant, loading cannot be performed, so that the values of mol cadmium/mol oxime are low even when the pH is high.

Referring to June, it is confirmed that cadmium is not loaded because the oxime is low, and the capacity of oxime is insufficient after cobalt, zinc, and manganese are loaded.

Further, referring to November, it is confirmed that mol total metal/mol oxime is low, and mol cadmium/mol oxime tends to be high and low even at low pH, which indicating that the total amount of metal in the DSX feed solution is small, and thus there is a lot of space in the oxime capacity, which affects the loading of cadmium.

The LIX 63 (Oxime) field analysis results provide indicators directly identifying the LIX 63 concentration through the analysis. Cd can be used as an indirect indicator to indirectly confirm the pH control or degradation of the extractant.

In order to have an appropriate range of pH concentration to inhibit solvent degradation during the DSX process, the present invention may provide the prediction by measuring pH concentration after extraction and by analyzing the concentration of cadmium indirectly extracted as an auxiliary means.

Although a plurality of stirrer reaction tanks is used for the extractant, which is the DSX solvent, and the stirrer reaction tank is used several times, the method of inhibiting solvent degradation may extend the lifetime of the extractant used in the DSX process.

It is apparent to those skilled in the art that the present invention described above is not limited to the above-described embodiments and the accompanying drawings, and that the various substitutions, changes, and modifications can be made therein without departing from the spirit of the invention.

What is claimed is:

1. A method of inhibiting degradation of an extractant in a DSX (synergistic solvent extraction) process, the method comprising the steps of:
    (a) adjusting a ratio of an extractant to a diluent in the DSX solvent to adjust a concentration of the extractant in the DSX solvent to a certain range;
    (b) extracting a metal contained in a pregnant leached solution from a mixture of the DSX solvent and a pregnant leached solution contained in a settler by adjusting a ratio of the, wherein the mixture is contained in a settler and separated into an aqueous phase solution and an organic phase solvent containing an extracted metal;
    (c) measuring pH of the aqueous phase solution;
    (d) adding soda ash ($Na_2CO_3$) to the aqueous phase solution to control the measured pH of the aqueous phase solution to be in a range of pH3 to pH7; and
    (e) scrubbing with a scrubbing solution having a zinc concentration of 2 g/L to 20 g/L by zinc sulfate ($ZnSO_4$) in order to remove manganese from the organic phase solvent containing the extracted metal.

2. The method of claim 1, wherein, in the step (d), the range of pH 3 to pH 7 is determined by a value of mol oxime to mol cadmium.

3. The method of claim 1, wherein the step (e) comprises: drying the zinc sulfate in a powder form using a dryer at a temperature of 120° C. to 160° C., which is higher than a flash point in order to remove a solvent of a zinc solvent extraction entrained in a zinc sulfate stripping solution.

4. The method of claim 1, wherein the step (d) comprises:
    controlling an amount of the soda ash ($Na_2CO_3$) to control the measured pH of the aqueous phase solution to be in the range of pH 3 to pH 7 3.

5. The method of claim 1, wherein, in the step (a), the extractant includes an oxime-based extractant and a neodecanoic acid-based extractant, and the diluent includes a kerosene-based compound, and
    wherein a concentration of the oxime-based extractant is in a range of 0.5 v/v% to 6 v/v%.

6. The method of claim 1, wherein, in the step (b), the settler includes at least one stirrer reaction tank ,
    wherein a volume ratio of the DSX solvent to the pregnant leached solution is in a range of 0.5 to 3, and
    wherein the at least one stirrer reaction tank performs stirring at a temperature of 35° C. to 55° C. for 0.5 minutes to 3 minutes.

* * * * *